(12) United States Patent
Vivanco

(10) Patent No.: US 12,309,710 B2
(45) Date of Patent: May 20, 2025

(54) CONTROLLING COVERAGE RANGE FOR SERVING CELL EQUIPMENT SERVICING AERIAL USER EQUIPMENT OVER ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 459 days.

(21) Appl. No.: 17/662,552

(22) Filed: May 9, 2022

(65) Prior Publication Data

US 2023/0362829 A1 Nov. 9, 2023

(51) Int. Cl.
*H04B 7/185* (2006.01)
*H04W 52/24* (2009.01)
*H04W 52/36* (2009.01)

(52) U.S. Cl.
CPC ...... *H04W 52/241* (2013.01); *H04B 7/18506* (2013.01); *H04W 52/367* (2013.01)

(58) Field of Classification Search
CPC .............. H04W 52/241; H04W 52/367; H04B 7/18506
USPC ......................................... 370/316
See application file for complete search history.

(56) References Cited

U.S. PATENT DOCUMENTS

| 2020/0252838 A1* | 8/2020 | Akdeniz | H04W 36/0061 |
| 2021/0159971 A1* | 5/2021 | Panchal | H04B 7/1855 |
| 2022/0150717 A1* | 5/2022 | Geng | H01Q 3/20 |

OTHER PUBLICATIONS

"Study on enhanced LTE support for aerial vehicles," RP-170779, NTT DOOCOMO, Ericsson, Mar. 2017, http://www.3gpp.org/ftp/tsg_ran/tsg_ran/TSGR_75/Docs/RP170779.zip, Accessed on Mar. 8, 2022, 4 pages.

* cited by examiner

Primary Examiner — Temica M Beamer

(57) ABSTRACT

An architecture for controlling the coverage range of serving cell equipment servicing UAVs over advanced networks. A method can comprise receiving channel quality indicator values representing a channel quality experienced by aerial user equipment, based on the channel quality indicator value, determining that the channel quality being experienced by the aerial user equipment is less than a low signal quality threshold value, based on channel quality indicator value falling below the low signal quality threshold value, determining that the aerial user equipment is located at a edge portion of a broadcast coverage area cast by the serving cell equipment, and based on determining that the aerial user equipment is located at the edge portion of the broadcast coverage area, instructing the serving cell equipment to set a transmission gain value associated with the serving cell equipment to a maximum value.

18 Claims, 12 Drawing Sheets

| eNB-Radio | PA.1 | PA.2 | | eNB-Radio | PA.1 | PA.2 | | eNB-Radio | PA.1 | PA.2 |
|---|---|---|---|---|---|---|---|---|---|---|
| | Gain=40db | Gain=40db | | | Gain=40db | Gain=40db | | | Gain=40db | Gain=40db |
| enb.tx.gain = +30db  TX.power = -60+30 = -30 dbm | +10dbm | +50dbm | | enb.tx.gain = +25db  TX.power = -60+25 = -35 dbm | +5dbm | +45dbm | | enb.tx.gain = +20db  TX.power = -60+20 = -40 dbm | +0dbm | +40dbm |
| 0.000001 W | 0.01 W | 100 W | | 3.16e-7 W | 0.003 W | 32 W | | 1e-7 W | 0.001 W | 10 W |

800 ↗   *TX-Power Reduction* →   *TX-Power Reduction* →

FIG. 8

CONTROLLING COVERAGE RANGE FOR SERVING CELL EQUIPMENT SERVICING AERIAL USER EQUIPMENT OVER ADVANCED NETWORKS

TECHNICAL FIELD

The disclosed subject matter relates to controlling coverage range for serving cell equipment servicing aerial user equipment (aerial UE) or unmanned aerial vehicles (UAVs) over advanced networks, such as, but not limited to long term evolution (LTE) and/or fifth generation (5G) networks.

BACKGROUND

Wireless operators can use terrestrial cellular network equipment, such as long-term evolution (LTE) and/or fifth-generation (5G) core mobile network operator (MNO) equipment to provide services to aerial UE. Aerial user equipment UE can have multiple use cases (e.g., delivery, monitoring, . . . ). Wireless operators can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether they can fly in a given direction.

BRIEF DESCRIPTION OF DRAWINGS

FIG. 8 depicts an example set of tables that can be used to adjust serving cell equipment transmission gain values, in accordance with aspects of the subject disclosure.

DETAILED DESCRIPTION

Figure 1:
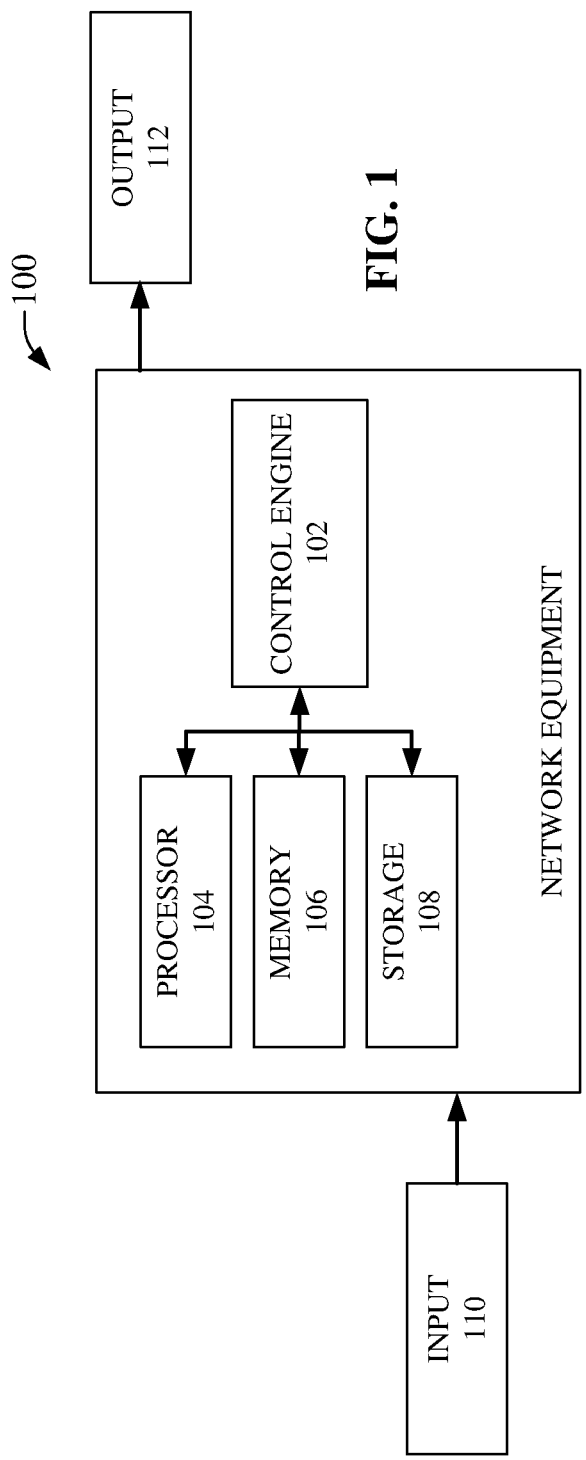
FIG. 1 is an illustration of a system for controlling the coverage range for serving cell equipment servicing aerial UE or UAVs over advanced networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor (and/or one or more additional processors), and a memory (and/or one or more additional memories) that stores executable instructions that, when executed by the processor, facilitate performance of operations. The operations can comprise receiving a channel quality indicator value representing a channel quality being experienced by an unmanned aerial vehicle, determining, based on the channel quality indicator value, that the channel quality being experienced by the unmanned aerial vehicle is less than a low signal quality threshold value, determining, based on attach request attempt messages sent by the unmanned aerial vehicle to serving cell equipment, that the unmanned aerial vehicle is located at a peripheral edge of a broadcast coverage area cast by the serving cell equipment, and based on determining that the unmanned aerial vehicle is located at the peripheral edge of the broadcast coverage area, instructing the serving cell equipment set a transmission gain value associated with the serving cell equipment to a maximum value.

In the context of the foregoing, the serving cell equipment can be special serving cell equipment, wherein the special serving cell equipment can be associated with groups of up tilted antennas. Further, the special serving cell equipment can be specifically dedicated to service the unmanned aerial equipment, and can be capable of transmitting, using the up tilted antenna, at a transmission power value greater than standard cells that serve terrestrial user equipment (e.g., typically approaching 100 Watts). Additionally, the special serving cell equipment can be capable of adjusting the transmission gain value from a first transmission gain value to a second transmission gain value. Moreover, the special serving cell equipment can include a group of amplifiers configured in a cascade mode. The special serving cell equipment in response to a transmission gain value being set to a maximum value, a broadcast umbra cast by the special serving cell equipment to service the unmanned aerial vehicle can be increased to cover a greater geographic coverage area. Conversely, the special serving cell equipment, in response to the transmission gain value being set to a minimum value, a broadcast penumbra cast by the special serving cell equipment to service the unmanned aerial vehicle can be decreased to cover a smaller geographic coverage area.

In accordance with further embodiments, the subject disclosure describes methods and/or processes, comprising a series of acts that, for example, can include: receiving, by a device comprising a processor, a channel quality indicator value representing a channel quality being experienced by an unmanned aerial vehicle, based on the channel quality indicator value, determining, by the device, that the channel quality being experienced by the unmanned aerial vehicle is greater than a high signal quality threshold value, based on attach request attempt messages sent by the unmanned aerial vehicle to serving cell equipment, determining, by the device, that the unmanned aerial vehicle is located at a center portion of a broadcast coverage area cast by the serving cell equipment, and based on determining that the unmanned aerial vehicle is located at the center portion of the broadcast coverage area and a numerical count value associated with the attach request attempt messages, instructing the serving cell equipment set a transmission gain value associated with the serving cell equipment to a minimum value.

In accordance with still further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include: receiving a channel quality indicator value representing a channel quality being experienced by an aerial user equipment, based on the channel quality indicator value representing a channel quality being experienced by the aerial user equipment, determining that the channel quality being experienced by the aerial user equipment is less than a low signal quality threshold value, based on channel quality indicator value falling below the low signal quality threshold value, determining that the aerial user equipment is located at the a—edge portion of a broadcast coverage area cast by the serving cell equipment, and based on determining that the aerial user equipment is located at the edge portion of the broadcast coverage area, instructing the serving cell equipment to set a transmission gain value associated with the serving cell equipment to a maximum value.

The subject disclosure, in example embodiments, describes systems and methods to control the coverage range for serving cell equipment (special serving cell equipment, such as eNodeB s, base station equipment, gNodeBs, eNBs, . . . ) servicing aerial UE over LTE/5G networks. These special serving cell equipment can have a radio-module responsible for transmission and reception of the LTE/5G waveform. This module can also be responsible to set the waveform gain (e.g., eNodeB transmission gain (enb.tx.gain)). This disclosure proposes a dynamic aerial cell coverage configuration by means of adjusting enb.tx-.gain. By adjusting enb.tx.gain, given special serving cell equipment can increase or reduce their cell coverage. The proposed process can be used to perform intelligent eNodeB tx.power saving. eNodeB transmission power saving can be performed based on the number of UAV(s) attached to the special serving cell equipment and/or how distant the UAV(s) are from the special serving cell equipment.

As noted earlier, wireless operators can add extra up-tilted serving cell equipment antennas to complement terrestrial coverage. These up-tilted serving cell equipment (e.g., special terrestrial based serving cell equipment that specifically service UAVs) can have high transmission power (tx.power) level values, for instance, in the range of about 100 W as compared to traditional serving cell equipment with generally down-tilted antennas that typically have tx.power level values in the range of about 40 W. If a UAV is not attached to the special terrestrial based serving cell equipment and/or the UAV is not in a given location, then the special terrestrial based serving cell equipment can be wasting power transmitting a waveform at higher power when no UAVs are in the broadcast service coverage area afforded by these special terrestrial based serving cell equipment.

The disclosed solution controls the coverage range of serving cell equipment that can have been specifically tasked with providing service to aerial UE or UAV equipment in flight. This solution allows serving cell equipment tasked with providing service, via one or more up-tilted antennae, to UAV equipment to intelligently increase and/or decrease (e.g., vary) its coverage umbrae/penumbrae automatically and/or on demand. In this manner, intelligent eNB tx.power savings can be attained. eNB tx.power saving can be performed based at least in part on whether or not UAV equipment is attached to the serving cell equipment, and/or the measured distance the UAV equipment is from the serving cell equipment.

Wireless mobile network operator entities (MNOs) can use terrestrial cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to aerial UE. UAVs and/or aerial UE can have multiple use cases (e.g., delivery, monitoring, . . . ). Wireless MNOs can have aerial coverage maps, which can indicate areas with and/or without cellular coverage.

The subject disclosure provides for detecting and/or identifying UE based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various embodiments, UE can be identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one or more embodiments, having identified and/or detected an approaching UE, the detected UE can be monitored and tracked to determine whether or not the approaching UE is on a trajectory that may bring the UE within the broadcast ambit of serving cell equipment. In order to determine whether or not the approaching UE may be on a trajectory that may bring it within the broadcast coverage area of serving cell equipment, artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are not detrimentally affected.

In example embodiments, in order to track UE entering and/or exiting the control and/or the monitoring ambits (e.g., processes in execution), one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits. Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a restricted area. In a similar manner, a detection system that uses radio waves to determine the range, angle, or velocity of objects (e.g., radar) can be used to determine whether or not UE are approaching and/or entering into the determined vicinity of the restricted area. Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or more network equipment can be used to triangulate and provide a positional reference as to the trajectory of an individual UE. In additional and/or alternative instances, timing advance (TA) processes can be used as a measure of TOA. Typically, TA is a determined distance from serving cell equipment based at least in part on delay measurements associated with TOA values. TA values can be reported while aerial UE are in communication with serving cell equipment.

In described embodiments, the systems and methods that control the coverage range of serving cell equipment that serve aerial UEs over LTE/5G can initiate processes to facilitate and/or effectuate the following tasks: detect whether or not a UAV or aerial UE is attached (or about to attach) to serving cell equipment. In instances where a UAV is detected at the serving cell equipment the UAV can periodically report channel quality indicator (CQI) values to serving cell equipment. In this regard, high CQI values (e.g., CQI values that equal or exceed one or more threshold values) are indicative of good signal quality, meaning that the UAV is proximate to a central portion of the coverage range provided by the serving cell equipment. In instances where the CQI values are low (e.g., CQI values that are equivalent to or less than the one or more threshold values) indicate poor signal quality, meaning that the UAV is proximate to a peripheral edge of the broadcast coverage area afforded by the serving cell equipment. Serving cell equipment can at defined or definable time periods can report to core network equipment the number of UAVs that are attached to the serving cell equipment. Serving cell equipment can, at determined and/or determinable time periods, report to core network equipment international mobile subscriber identifier (IMSI) values, or subscriber identity module or subscriber identification module (SIM) values associated with the attached UAVs. Also, serving cell equipment, in addition to IMSI values, SIM values, and the like, can also send CQI values as determined by each of the attached UAVs.

The serving cell equipment can also report aerial UE attach requests in response to determining, by network equipment (e.g., serving cell equipment and/or core network equipment), that UAV are attempting to attach to serving cell equipment via physical random access channel (PRACH) requests. The network equipment can in response determine the amount of power that UAVs are using to transmit the PRACH request. The amount of power that UAVs use to transmit the PRACH request can be determined based at least in part on UAV.PRACH.power value data that can have been included in the PRACH requests and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

In some embodiments where the network equipment observes that a UAV is associated with large UAV.PRACH.power values (or UAV.PRACH.power values that equal or exceed one or more defined threshold values) indicative of the UAV being located at a peripheral edge boundary of the broadcast range of serving cell equipment, the network equipment (e.g., core network equipment, serving cell equipment, etc.) can direct the serving cell equipment to which the UAV is attached to set the eNB transmission gain (enb.tx.gain) values to a high value in relation to a defined normalized transmission gain threshold value.

In other embodiments, where the network equipment notes that a UAV is attached and the CQI values are observed to be high in relation to a defined normalized CQI threshold value, the network equipment can direct the serving cell equipment to which the UAV is attached to set the enb.tx.gain values to a low value in relation to the defined normalized transmission gain threshold value. This can mean that the UAV is in proximity to a central location of the serving cell equipment's broadcast coverage, and as such the serving cell equipment can reduce its tx.power values to save energy.

In further embodiments, where the network equipment notes that a UAV is attached and the CQI values are also noted to be high in relation to a defined normalized CQI threshold value, the network equipment can direct the serving cell equipment to which the UAV is attached to set the enb.tx.gain values to a high value in relation to the defined normalized transmission gain threshold value. This can mean that the UAV is at the edge of the broadcast coverage range associated with the serving cell equipment and that the serving cell equipment should increase its tx.power values to ensure that the UAV remains within the broadcast ranged afforded by the serving cell equipment.

In instances where network equipment determines that serving cell equipment has no UAVs attached to it and/or no PRACH requests have been detect within a determinable time period, the network equipment can direct the serving cell equipment to set the enb.tx.gain value to a very low value (e.g., an operationally negligible value approaching zero) in relation to the defined normalized transmission gain threshold value in order to maximize energy savings.

In regard to the foregoing defined normalized transmission gain threshold value metrics, multiple defined normalized transmission gain threshold values can be used with equal functionality and/or facility. For example, a first defined normalized transmission gain threshold value can be used in relation to high enb.tx.gain values, and a second defined normalized transmission gain threshold value can be used in relation to low enb.tx.gain values. Thus, the first defined normalized transmission gain threshold value can be an upper boundary value in relation to setting the enb.tx.gain value to a high value, and the second defined normalized transmission gain threshold value can be a lower boundary value in relation to setting the enb.tx.gain value to a low value. As will be appreciated by those of ordinary skill, the first defined normalized transmission gain threshold value and the second defined normalized transmission gain threshold value can typically, though not necessarily always, be different values.

Similarly, in relation of the foregoing defined normalized CQI threshold value metrics, a group of defined normalized CQI threshold value can be used. For instance, first defined normalized CQI threshold values can be used in reference to good signal quality, and second defined normalized CQI threshold values can be used in reference to poor signal quality. Once again, as will be observed by those of ordinary skill, the first defined normalized CQI threshold value and the second defined normalized CQI threshold value can typically, though not necessarily always, be different values.

In the context of the subject disclosure, network equipment and/or serving cell equipment can typically be base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, or other such equipment. Further, the disclosed systems and/or methods can be operational at central node global control equipment (e.g., network equipment) located in the core network. Examples of central node global control equipment can be mobile edge computing (MEC) equipment, self organized network (SON) equipment, and/or radio access network intelligent controller (RIC) equipment.

In some embodiments, UE information data and/or UE device type data is collected. It can be detected when, where, and whether an aerial UE is attached to, and/or is in operative communication with, the core network (or identifiable segments of the core network). Additionally, in accordance with further example embodiments, data can be collected that is representative of serving cell equipment capabilities, as well as network topologies of serving cell equipment (e.g., the network topologies of serving cell equipment currently providing service to aerial UE and/or terrestrial based UE situated within the broadcast range of current cell equipment and neighboring serving cell equipment that can be immediately proximate to, or positioned at distance from, current serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Now with reference to FIG. 1 that illustrates a system 100 (e.g., network equipment—central node global control equipment) that can control the coverage range of serving cell equipment servicing aerial user equipment (aerial UE) or unmanned aerial vehicles (UAVs) over long term evolution (LTE) and/or fifth generation (5G) networks, in accordance with various embodiments. As illustrated system 100 can comprise control engine 102 that can be communicatively coupled to processor 104, memory 106, and storage 108. Control engine 102 can be in communication with processor 104 for facilitating operation of computer and/or machine executable instructions and/or components by control engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by control engine 102 to produce one or more useful, concrete, and tangible result, and/or transform one or more articles to different states or things. Further, system 100 can also generate and output the useful, concrete, and tangible results, and/or the transformed one or more articles produced by control engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to dynamically configure inter-cell interference coordination between terrestrial based serving cell equipment that are serving aerial UE. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Control engine 102 can identify UE, e.g., aerial UE, based at least in part, for example, on IMSI values, or SIM values. Additionally and/or alternatively, control engine 102 can identify approaching UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated by control engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of approaching UE can be effectuated by control engine 102 by using computer-vision based recognition technologies, wherein one or more unique surface contours (or identifiable surface point patterns) of the approaching UE can be compared with repositories and databases of manufacturer defined contours or determinable surface point patterns associated with UE.

Control engine 102, having identified and/or detected approaching UE can monitor and track the detected UE to determine whether or not the approaching UE is attached, and/or about to attach, to serving cell equipment. At this juncture, the approaching UE (or UAV) can report CQI values to the serving cell equipment and the serving cell equipment can forward the reported CQI values to network equipment. The approaching UE can report its CQI values at predetermined or predefined time periods and/or on an ad hoc basis. Control engine 102 can determine based at least in part on the received CQI values whether the signal being received by the approaching UE is good or poor. High CQI values can represent good signal quality which typically is indicative that the approaching UE is located at a center of the serving cell equipment's broadcast coverage area; low CQI values can represent poor signal quality that can be indicative that the approaching UE is located toward a peripheral edge of the serving cell equipment's broadcast coverage area. Additionally, serving cell equipment can report the number of aerial UEs that are attached to it as well as the associated identification data associated with each of the attached aerial UEs.

Serving cell equipment can also report, to network equipment, UE attach requests (e.g., PRACH request data) that it has received. In response to receiving the report associated with UE attach requests, control engine 102 based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

In some embodiments where the control engine 102 observes that a UAV is associated with large UAV.PRACH.power values (or UAV.PRACH.power values that equal or exceed one or more defined threshold values) indicative of the UAV being located at a peripheral edge bound of the broadcast range of serving cell equipment, the control engine 102 can direct the serving cell equipment to which the UAV is attached to set enb.tx.gain values to a high value in relation to a defined normalized transmission gain threshold value.

In other embodiments, where the control engine 102 notes that a UAV is attached and the CQI values are observed to be high in relation to a defined normalized CQI threshold value, control engine 102 can direct the serving cell equipment to which the UAV is attached to set the enb.tx.gain values to a low value in relation to the defined normalized transmission gain threshold value. This can mean that the UAV is in proximity to a central location of the serving cell equipment's broadcast coverage, and as such the serving cell equipment can reduce its tx.power values to save energy.

In further embodiments, where control engine 102 notes that a UAV is attached and the CQI values are noted to be high in relation to a defined normalized CQI threshold value, the control engine 102 can direct the serving cell equipment to which the UAV is attached to set the enb.tx.gain values to a high value in relation to the defined normalized transmission gain threshold value. This can mean that the UAV is at the edge boundary of the broadcast coverage range associated with the serving cell equipment and that the serving cell equipment should increase its tx.power values to ensure that the UAV remains within the broadcast ranged afforded by the serving cell equipment.

In instances where control engine 102 determines that serving cell equipment has no UAVs attached to it and/or no PRACH requests have been detected within a determinable time period, the control engine 102 can direct the serving cell equipment to set the enb.tx.gain value to a very low value (e.g., an operationally negligible value approaching zero) in relation to the defined normalized transmission gain threshold value in order to maximize energy savings.

In view of the example system(s) described above, example method(s) that can be implemented in accordance with the disclosed subject matter can be better appreciated with reference to the flowcharts and/or illustrative time sequence charts in FIGS. 2-7. For purposes of simplicity of explanation, an example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 2:
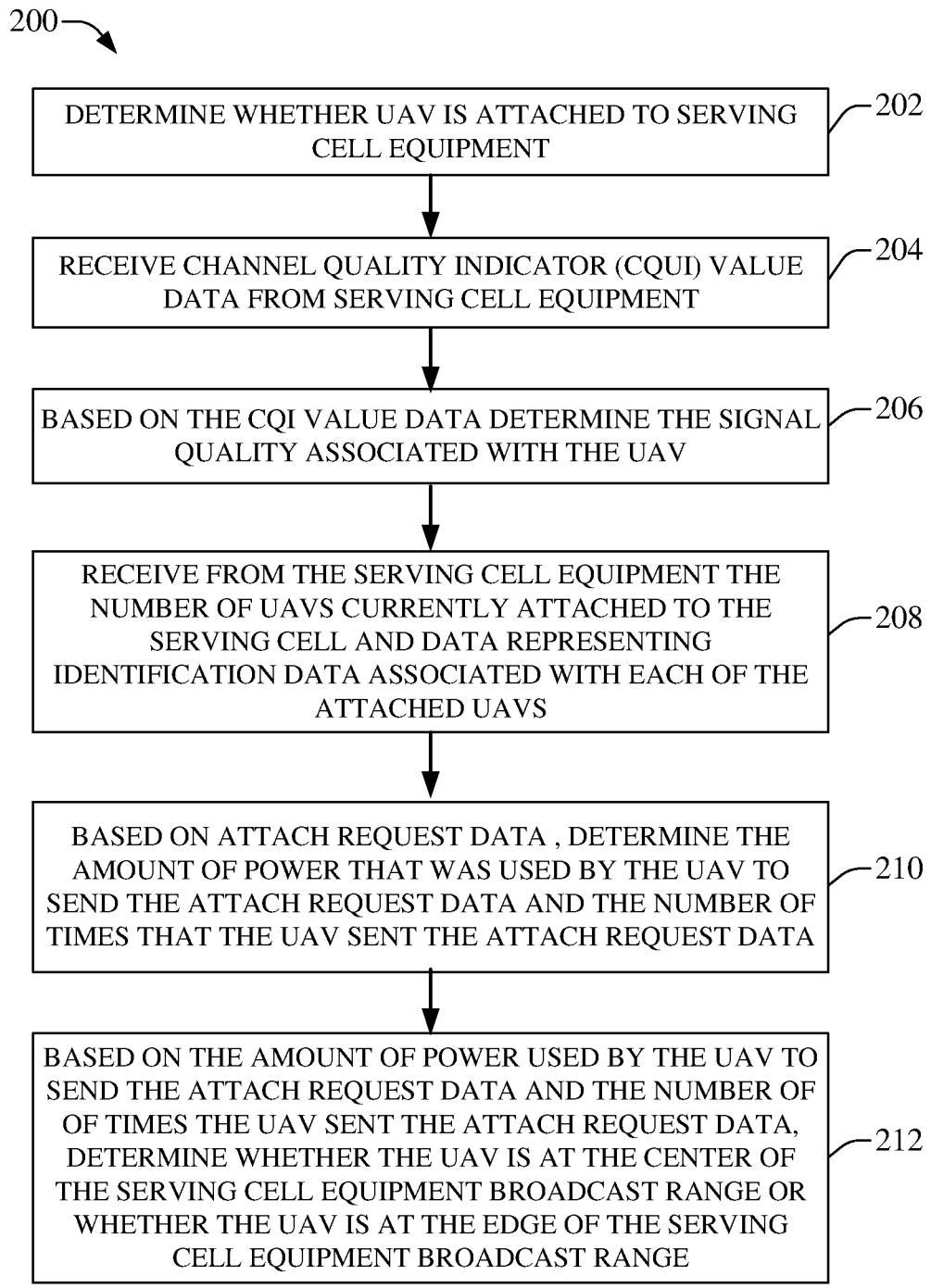
FIG. 2 provides illustration of a flow chart or method for controlling the coverage range for serving cell equipment servicing aerial UE or UAVs over advanced networks in accordance with aspects of the subject disclosure.

FIG. 2 illustrates a flow chart or method 200 that can be used to control the coverage range for serving cell equipment servicing aerial UE or UAVs over advanced networks, in accordance with aspects of the subject disclosure. Method 200 can commence at act 202 where core equipment (e.g., network equipment, control engine 102) can monitor and track detected UE to determine whether or not the approaching UE is attached, and/or about to attach, to serving cell equipment. At this juncture, the approaching UE (or UAV) can, at act 204, report CQI values to the serving cell equipment and the serving cell equipment can forward the reported CQI values to network equipment. The approaching UE can report its CQI values at predetermined or predefined time periods and/or on an ad hoc basis. At act 206 core equipment can determine based at least in part on the received CQI values whether the signal being received by the approaching UE is good or poor. High CQI values can represent good signal quality which typically is indicative that the approaching UE is located at a center of the serving cell equipment's broadcast coverage area; low CQI values can represent poor signal quality that can be indicative that the approaching UE is located toward a peripheral edge of the serving cell equipment's broadcast coverage area. Additionally, at act 208, serving cell equipment can report to core equipment the number of aerial UEs that are attached to it as well as the associated identification data associated with each of the attached aerial UEs.

Serving cell equipment, at act 208, can also report, to network equipment, UE attach requests (e.g., PRACH request data) that it has received. At act 210 in response to receiving the report associated with UE attach requests, core equipment based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

In some embodiments where core equipment observes that a UAV is associated with large UAV.PRACH.power values (or UAV.PRACH.power values that equal or exceed one or more defined threshold values) indicative of the UAV being located at a peripheral edge bound of the broadcast range of serving cell equipment, core equipment, at act 212 can direct the serving cell equipment to which the UAV is attached to set enb.tx.gain values to a high value in relation to a defined normalized transmission gain threshold value.

In other embodiments, where core equipment notes that a UAV is attached and the CQI values are observed to be high in relation to a defined normalized CQI threshold value, core equipment, at act 212 can direct the serving cell equipment to which the UAV is attached to set the enb.tx.gain values to a low value in relation to the defined normalized transmission gain threshold value. This can mean that the UAV is in proximity to a central location of the serving cell equipment's broadcast coverage, and as such the serving cell equipment can reduce its tx.power values to save energy.

In further embodiments, where core equipment notes that a UAV is attached and the CQI values are noted to be high in relation to a defined normalized CQI threshold value, the core equipment, at act 212, can direct the serving cell equipment to which the UAV is attached to set the enb.tx.gain values to a high value in relation to the defined normalized transmission gain threshold value. This can mean that the UAV is at the edge boundary of the broadcast coverage range associated with the serving cell equipment and that the serving cell equipment should increase its tx.power values to ensure that the UAV remains within the broadcast ranged afforded by the serving cell equipment.

In instances where core equipment determines that serving cell equipment has no UAVs attached to it and/or no PRACH requests have been detected within a determinable time period, core equipment, at act 212, can direct the serving cell equipment to set the enb.tx.gain value to a very low value (e.g., an operationally negligible value approaching zero) in relation to the defined normalized transmission gain threshold value in order to maximize energy savings.

Figure 3:
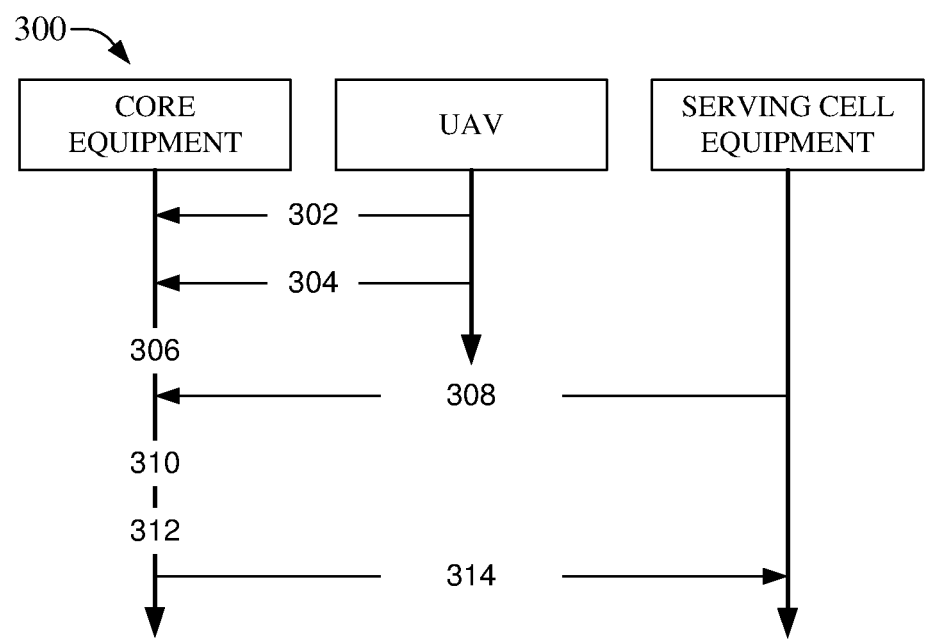
FIG. 3 provides illustration of a time sequence chart or method for controlling the coverage range for serving cell equipment servicing aerial UE or UAVs over advanced networks, in accordance with aspects of the subject disclosure.

FIG. 3 illustrates a time sequence chart or method 300 that can be used to control the coverage range for serving cell equipment servicing aerial UE or UAVs over advanced networks, in accordance with aspects of the subject disclosure.

Time sequence chart 300 can commence at act 302 where core equipment can monitor and track detected UE to determine whether or not the approaching UE is attached, and/or about to attach, to serving cell equipment. At this juncture, the approaching UE (or UAV) can, at act 304, report CQI values to the serving cell equipment and the serving cell equipment can forward the reported CQI values to network equipment. The approaching UE can report its CQI values at predetermined or predefined time periods and/or on an ad hoc basis. At act 306 core equipment can determine based at least in part on the received CQI values whether the signal being received by the approaching UE is good or poor. Additionally, at act 308, serving cell equipment can report to core equipment the number of aerial UEs that are attached to it as well as the associated identification data associated with each of the attached aerial UEs.

Serving cell equipment, at act 308, can also report, to network equipment, UE attach requests (e.g., PRACH request data) that it has received. At act 310 in response to receiving the report associated with UE attach requests, core equipment based on the PRACH request data can determine, at act 312, the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

In some embodiments where core equipment observes that a UAV is associated with large UAV.PRACH.power values (or UAV.PRACH.power values that equal or exceed one or more defined threshold values) indicative of the UAV being located at a peripheral edge bound of the broadcast range of serving cell equipment, core equipment, at act 314 can direct the serving cell equipment to which the UAV is attached to set enb.tx.gain values to a high value in relation to a defined normalized transmission gain threshold value.

In other embodiments, where core equipment notes that a UAV is attached and the CQI values are observed to be high in relation to a defined normalized CQI threshold value, core equipment, at act 314 can direct the serving cell equipment to which the UAV is attached to set the enb.tx.gain values to a low value in relation to the defined normalized transmission gain threshold value. This can mean that the UAV is in proximity to a central location of the serving cell equipment's broadcast coverage, and as such the serving cell equipment can reduce its tx.power values to save energy.

In further embodiments, where core equipment notes that a UAV is attached and the CQI values are noted to be high in relation to a defined normalized CQI threshold value, the core equipment, at act 314, can direct the serving cell equipment to which the UAV is attached to set the enb.tx.gain values to a high value in relation to the defined normalized transmission gain threshold value. This can mean that the UAV is at the edge boundary of the broadcast coverage range associated with the serving cell equipment and that the serving cell equipment should increase its tx.power values to ensure that the UAV remains within the broadcast ranged afforded by the serving cell equipment.

In instances where core equipment determines that serving cell equipment has no UAVs attached to it and/or no PRACH requests have been detected within a determinable time period, core equipment, at act 314, can direct the serving cell equipment to set the enb.tx.gain value to a very low value (e.g., an operationally negligible value approaching zero) in relation to the defined normalized transmission gain threshold value in order to maximize energy savings.

Figure 4:
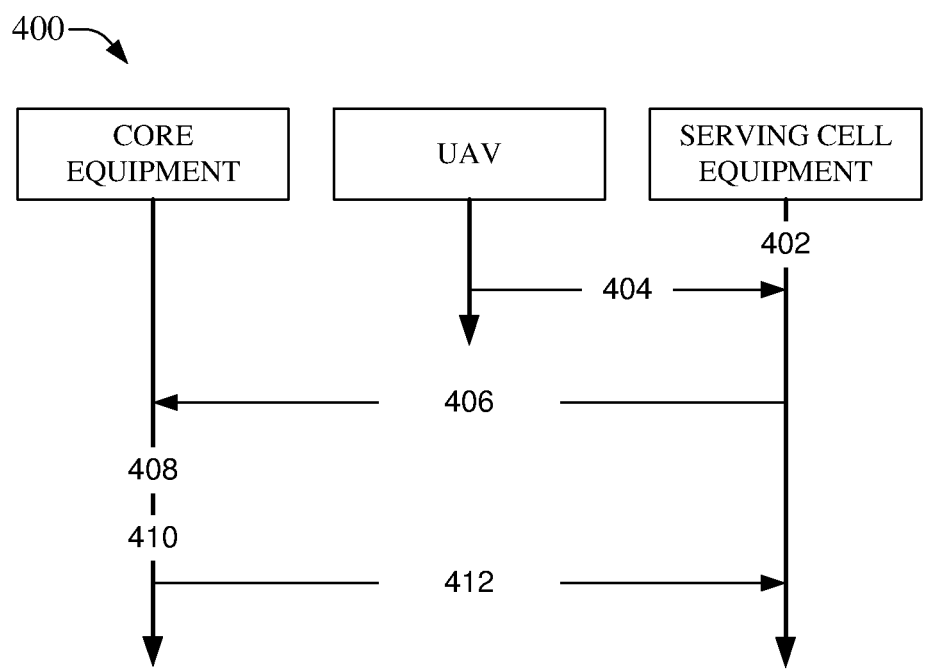
FIG. 4 provides illustration of another time sequence chart or method for controlling the coverage range for serving cell equipment servicing aerial UE or UAVs over advanced networks, in accordance with aspects of the subject disclosure.

FIG. 4 illustrates a time sequence chart or method 400 that can be used to control the coverage range for serving cell equipment servicing aerial UE or UAVs over advanced networks, such as, LTE and/or 5G networks, in accordance with aspects of the subject disclosure.

Time sequence chart 400 can commence at act 402 where serving cell equipment can monitor and track detected UE to determine whether or not the approaching UE is attached, and/or about to attach, to the serving cell equipment. At this juncture, the approaching UE (or UAV) can, at act 404, report CQI values to the serving cell equipment and the serving cell equipment can forward, at act 406, the reported CQI values to network equipment. The approaching UE can report its CQI values at predetermined or predefined time periods and/or on an ad hoc basis. Additionally, at act 406, serving cell equipment can also report to core equipment the number of aerial UEs that are attached to it as well as the associated identification data associated with each of the attached aerial UEs. Further, serving cell equipment, at act 406, can also report, to network equipment, UE attach requests (e.g., PRACH request data) that it has received. At act 408 core equipment can determine based at least in part on the received CQI values whether the signal being received by the approaching UE is good or poor.

At act 410 in response to receiving the report associated with UE attach requests, core equipment based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

Where core equipment observes that a UAV is associated with large UAV.PRACH.power values (or UAV.PRACH.power values that equal or exceed one or more defined threshold values) indicative of the UAV being located at a peripheral edge bound of the broadcast range of serving cell equipment, core equipment, at act 412 can direct the serving cell equipment to which the UAV is attached to set enb.tx.gain values to a high value in relation to a defined normalized transmission gain threshold value.

Figure 5:
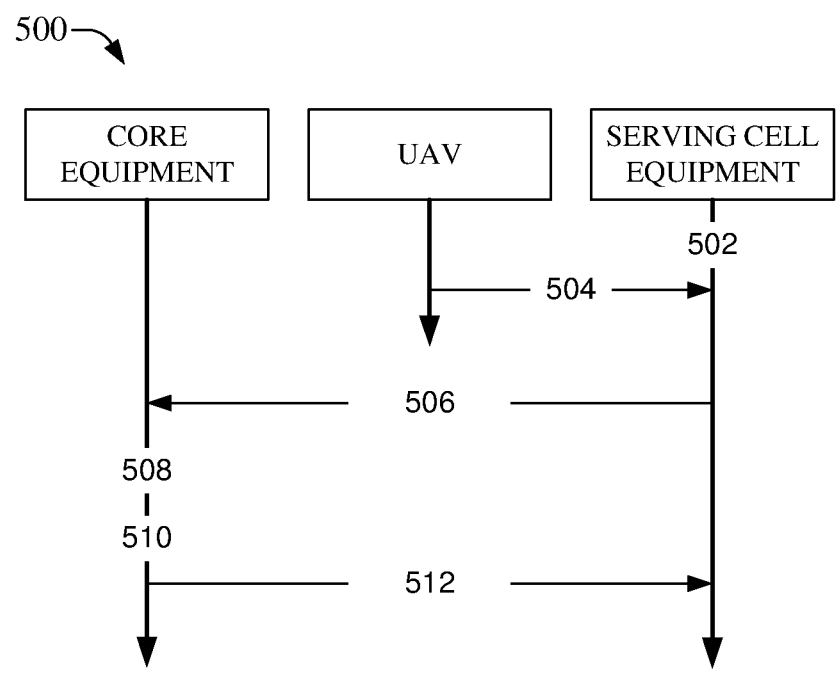
FIG. 5 provides illustration of a time sequence chart or method for controlling the coverage range for serving cell equipment servicing aerial UE or UAVs over advanced networks, in accordance with aspects of the subject disclosure.

FIG. 5 illustrates another a time sequence chart or method 500 that can be used to control the coverage range for serving cell equipment servicing aerial UE or UAVs over advanced networks, in accordance with aspects of the subject disclosure.

Time sequence chart 500 can commence at act 502 where serving cell equipment can monitor and track detected UE to determine whether or not the approaching UE is attached, and/or about to attach, to the serving cell equipment. At this juncture, the approaching UE (or UAV) can, at act 504, report CQI values to the serving cell equipment and the serving cell equipment can forward, at act 506, the reported CQI values to network equipment. The approaching UE can report its CQI values at predetermined or predefined time periods and/or on an ad hoc basis. Additionally, at act 406, serving cell equipment can also report to core equipment the number of aerial UEs that are attached to it as well as the associated identification data associated with each of the attached aerial UEs. Further, serving cell equipment, at act 506, can also report, to network equipment, UE attach requests (e.g., PRACH request data) that it has received. At act 508 core equipment can determine based at least in part on the received CQI values whether the signal being received by the approaching UE is good or poor.

At act 510 in response to receiving the report associated with UE attach requests, core equipment based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

Where core equipment notes that a UAV is attached and the CQI values are observed to be high in relation to a defined normalized CQI threshold value, core equipment, at act 512 can direct the serving cell equipment to which the UAV is attached to set the enb.tx.gain values to a low value in relation to the defined normalized transmission gain threshold value. This can mean that the UAV is in proximity to a central location of the serving cell equipment's broadcast coverage, and as such the serving cell equipment can reduce its tx.power values to save energy.

Figure 6:
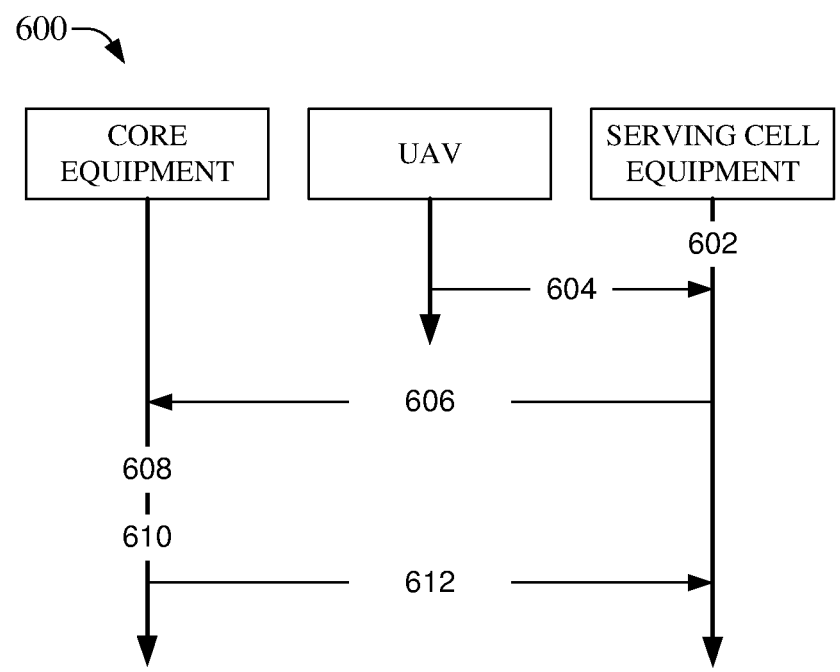
FIG. 6 provides depiction of yet a further time sequence chart or method for controlling the coverage range for serving cell equipment servicing aerial UE or UAVs over advanced networks, in accordance with aspects of the subject disclosure.

FIG. 6 illustrates another a time sequence chart or method 600 that can be used to control the coverage range for serving cell equipment servicing aerial UE or UAVs over advanced networks, in accordance with aspects of the subject disclosure.

Time sequence chart 600 can commence at act 602 where serving cell equipment can monitor and track detected UE to determine whether or not the approaching UE is attached, and/or about to attach, to the serving cell equipment. At this juncture, the approaching UE (or UAV) can, at act 604, report CQI values to the serving cell equipment and the serving cell equipment can forward, at act 606, the reported CQI values to network equipment. The approaching UE can report its CQI values at predetermined or predefined time periods and/or on an ad hoc basis. Additionally, at act 406, serving cell equipment can also report to core equipment the number of aerial UEs that are attached to it as well as the associated identification data associated with each of the attached aerial UEs. Further, serving cell equipment, at act 606, can also report, to network equipment, UE attach requests (e.g., PRACH request data) that it has received. At act 608 core equipment can determine based at least in part on the received CQI values whether the signal being received by the approaching UE is good or poor.

At act 610 in response to receiving the report associated with UE attach requests, core equipment based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

In instances, where core equipment notes that a UAV is attached and the CQI values are noted to be high in relation to a defined normalized CQI threshold value, the core equipment, at act 512, can direct the serving cell equipment to which the UAV is attached to set the enb.tx.gain values to a high value in relation to the defined normalized transmission gain threshold value. This can mean that the UAV is at the edge boundary of the broadcast coverage range associated with the serving cell equipment and that the serving cell equipment should increase its tx.power values to ensure that the UAV remains within the broadcast ranged afforded by the serving cell equipment.

Figure 7:
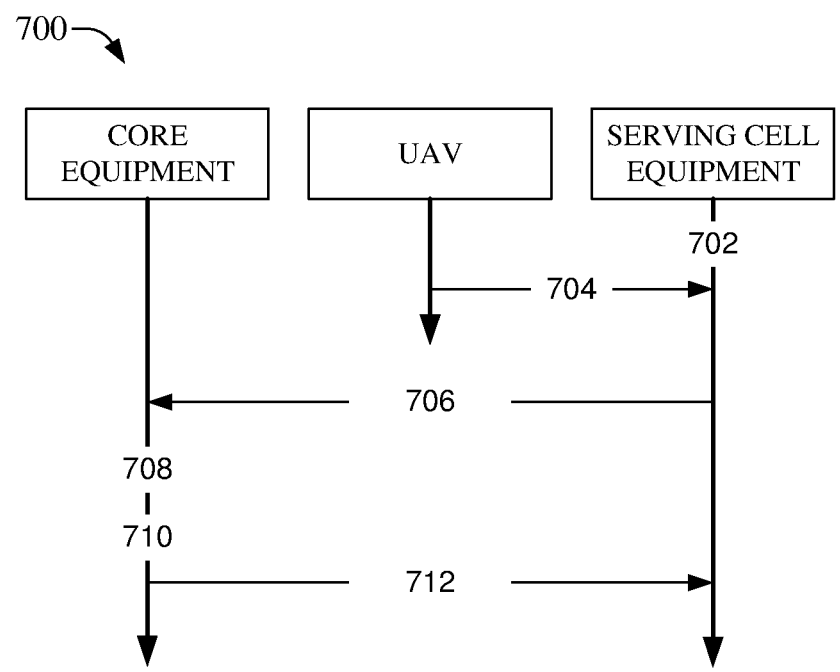
FIG. 7 depicts a time sequence chart or method for controlling the coverage range for serving cell equipment servicing aerial UE or UAVs over advanced networks, in accordance with aspects of the subject disclosure.

FIG. 7 illustrates another a time sequence chart or method 700 that can be used to control the coverage range for serving cell equipment servicing aerial UE or UAVs over advanced networks, in accordance with aspects of the subject disclosure.

Time sequence chart 700 can commence at act 702 where serving cell equipment can monitor and track detected UE to determine whether or not the approaching UE is attached, and/or about to attach, to the serving cell equipment. At this juncture, the approaching UE (or UAV) can, at act 704, report CQI values to the serving cell equipment and the serving cell equipment can forward, at act 706, the reported CQI values to network equipment. The approaching UE can report its CQI values at predetermined or predefined time periods and/or on an ad hoc basis. Additionally, at act 406, serving cell equipment can also report to core equipment the number of aerial UEs that are attached to it as well as the associated identification data associated with each of the attached aerial UEs. Further, serving cell equipment, at act 706, can also report, to network equipment, UE attach requests (e.g., PRACH request data) that it has received. At act 708 core equipment can determine based at least in part on the received CQI values whether the signal being received by the approaching UE is good or poor.

At act 710 in response to receiving the report associated with UE attach requests, core equipment based on the PRACH request data can determine the amount of power that UAVs are using to transmit the PRACH request data. As noted earlier, the amount of power that UAVs use to transmit the PRACH request data can be determined based at least in part on UAV.PRACH.power value data that can have been included in the PRACH request data and based at least in part on the number of attach-request messages that a particular UAV has sent to the serving cell equipment within a defined or definable period of time. Large UAV.PRACH.power values associated with a particular UAV, and large numbers of attach-request messages emitted from a particular UAV within defined or definable periods of time can be indicative that the UAV is at peripheral edge boundary of the serving cell equipment.

Where core equipment determines that serving cell equipment has no UAVs attached to it and/or no PRACH requests have been detected within a determinable time period, core equipment, at act 314, can direct the serving cell equipment to set the enb.tx.gain value to a very low value (e.g., an operationally negligible value approaching zero) in relation to the defined normalized transmission gain threshold value in order to maximize energy savings.

FIG. 8 illustrates an example set of tables that can be used to adjust enb.tx.gain values. By adjusting enb.tx.gain values serving cell equipment can increase and/or decrease it broadcast coverage umbrae/penumbrae.

In regard to the terrestrial based serving cell equipment (also referred to as special serving cell equipment or terrestrial based special serving cell equipment) disclosed herein, these special serving cell equipment are generally used only to provide additional coverage to UAV and typically do not provide coverage to terrestrial based UE. The disclosed terrestrial based special serving cell equipment generally can have a radio-module responsible to transmit and/or receive the LTE/5G waveform. The radio-module can also be responsible to set the waveform gain (e.g., enb.tx.gain) values. Generally, enb.tx.gain values can be set manually, and the enb.tx.gain values can be calibrated to achieve desirable enb.tx.power values. The final enb.tx.power values can be determined based on the following equation:

$$enb.tx.\text{power} = radio.enb.tx.\text{power} + enb.tx.\text{gain} + PA.\text{gain}.1 + PA.\text{gain}.2,$$

wherein two power amplifiers (PA) are used. enb.tx.gain values can be fine tuned to achieve desirable enb.tx.power values.

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment. Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant within the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 9:
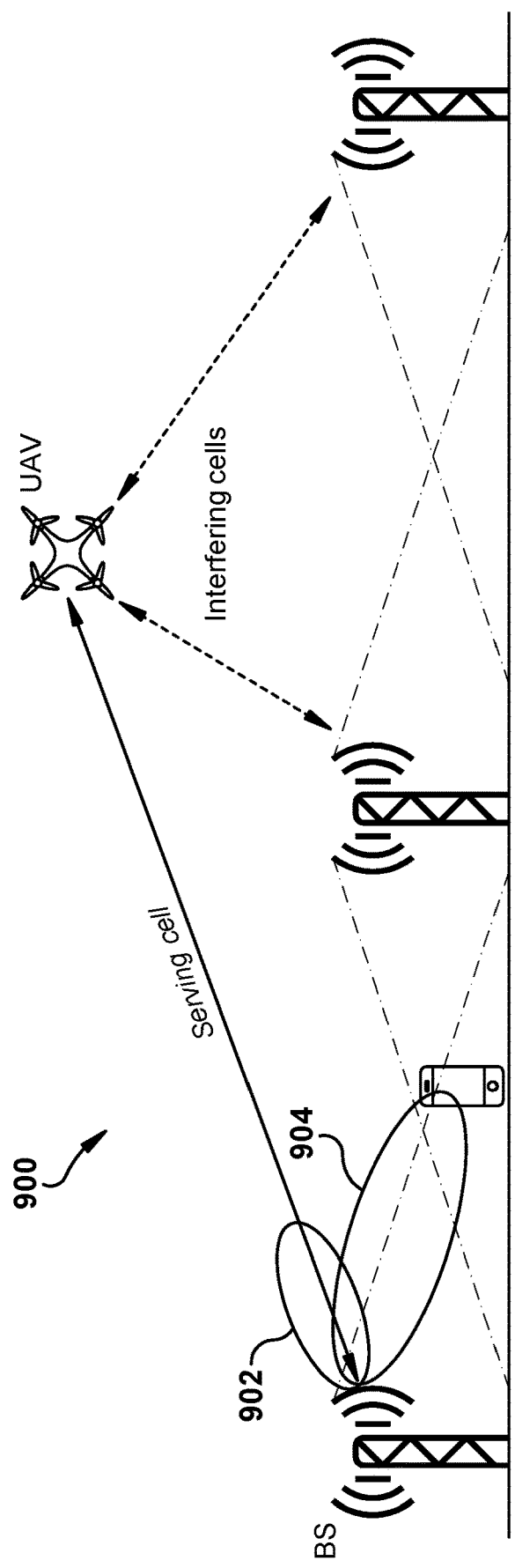
FIG. 9 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 9 illustrates the broadcast disparity between the down-tilted antennas 902 and side lobes 904.

Due to the presence of possible voids or nulls in the transmission side lobes 904, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 10:
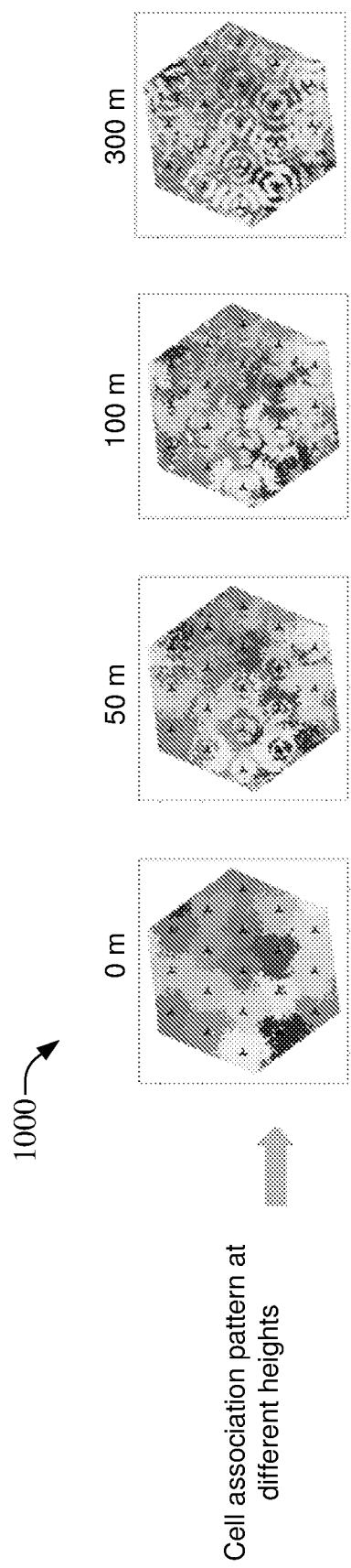
FIG. 10 provides depiction of network equipment association patterns at different altitudes, in accordance with aspects of the subject disclosure.

FIG. 10 provides depiction of the relative disparities in coverage areas between terrestrial coverage areas and aerial coverage areas. In FIG. 10 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 11:
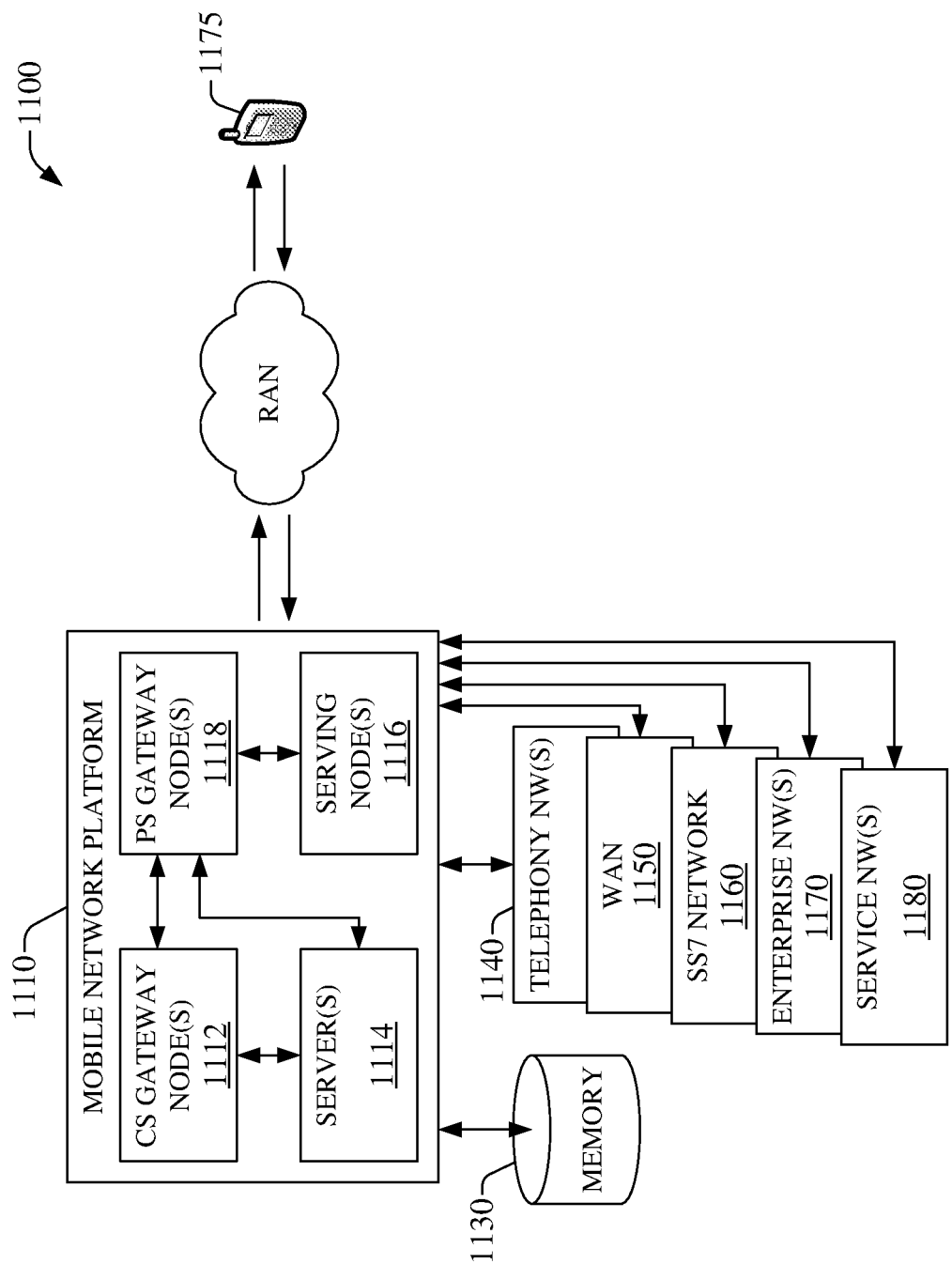
FIG. 11 is a block diagram of an example embodiment of a mobile network platform to implement and exploit various features or aspects of the subject disclosure.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
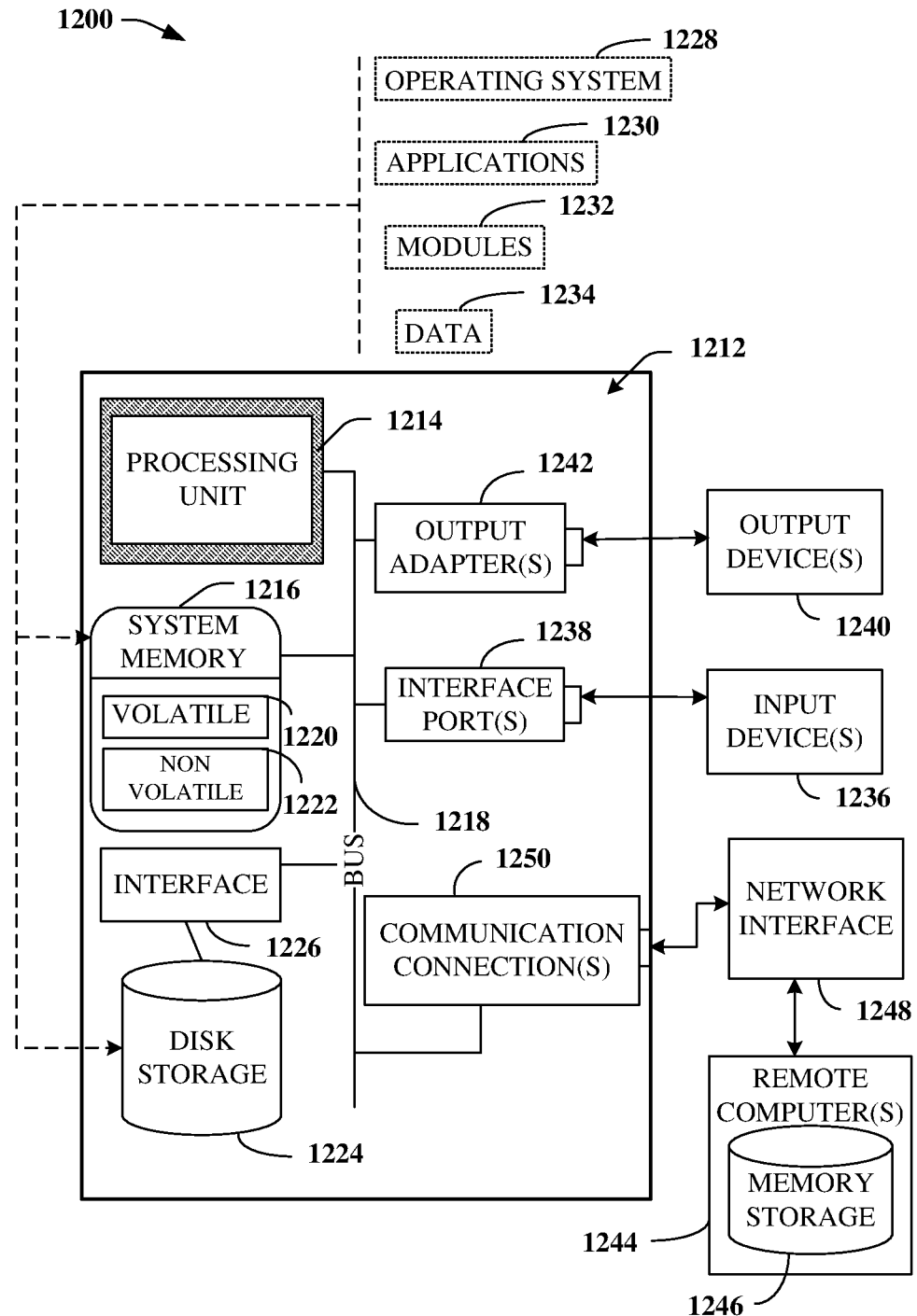
FIG. 12 illustrates a block diagram of a computing system operable to execute the disclosed example embodiments.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute one or more parts of one or more of the disclosed example embodiments. Computer 1212, which can be, for example, part of the hardware of system 100, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a device comprising a processor, a channel quality indicator value representing a channel quality being experienced by an unmanned aerial vehicle;
based on the channel quality indicator value, determining, by the device, that the channel quality being experienced by the unmanned aerial vehicle is greater than a high signal quality threshold value;
based on attach request attempt messages that were sent by the unmanned aerial vehicle to serving cell equipment, determining, by the device, that the unmanned aerial vehicle is located at a center portion of a broadcast coverage area cast by the serving cell equipment; and
based on the determining that the unmanned aerial vehicle is located at the center portion of the broadcast coverage area and a numerical count value associated with the attach request attempt messages, instructing, by the device, the serving cell equipment to set a transmission gain value associated with the serving cell equipment to a minimum value.

2. The method of claim 1, wherein the serving cell equipment is associated with a collection of up tilted antennas.

3. The method of claim 1, wherein the serving cell equipment is dedicated to service the unmanned aerial vehicle.

4. The method of claim 1, wherein the serving cell equipment is capable of transmitting, using up tilted antennas, at a transmission power value greater than standard cells that serve terrestrial user equipment.

5. The method of claim 1, wherein the serving cell equipment is capable of adjusting the transmission gain value from a first transmission gain value to a second transmission gain value.

6. The method of claim 1, wherein in response to the transmission gain value being set to the minimum value, a broadcast penumbra cast by the serving cell equipment to service the unmanned aerial vehicle is decreased to cover a smaller geographic coverage area.

7. A system comprising:
a processor; and
a memory that stores instructions that, when executed by the processor, facilitates performance of operations, the operations comprising:
- receiving a channel quality indicator value representing a channel quality being experienced by an unmanned aerial vehicle;
- based on the channel quality indicator value, determining that the channel quality being experienced by the unmanned aerial vehicle is greater than a high signal quality threshold value;
- based on attach request attempt messages that were sent by the unmanned aerial vehicle to serving cell equipment, determining that the unmanned aerial vehicle is located at a center portion of a broadcast coverage area cast by the serving cell equipment; and
- based on the determining that the unmanned aerial vehicle is located at the center portion of the broadcast coverage area and a numerical count value associated with the attach request attempt messages, instructing the serving cell equipment to set a transmission gain value associated with the serving cell equipment to a minimum value.

8. The system of claim 7, wherein the serving cell equipment is associated with a collection of up tilted antennas.

9. The system of claim 7, wherein the serving cell equipment is dedicated to service the unmanned aerial vehicle.

10. The system of claim 7, wherein the serving cell equipment is capable of transmitting, using up tilted antennas, at a transmission power value greater than standard cells that serve terrestrial user equipment.

11. The system of claim 7, wherein the serving cell equipment is capable of adjusting the transmission gain value from a first transmission gain value to a second transmission gain value.

12. The system of claim 7, wherein in response to the transmission gain value being set to the minimum value, a broadcast penumbra cast by the serving cell equipment to service the unmanned aerial vehicle is decreased to cover a smaller geographic coverage area.

13. A non-transitory machine-readable medium, comprising executable instructions that, when executed by a processor, facilitate performance of operations, the operations comprising:
- receiving a channel quality indicator value representing a channel quality being experienced by an unmanned aerial vehicle;
- based on the channel quality indicator value, determining that the channel quality being experienced by the unmanned aerial vehicle is greater than a high signal quality threshold value;
- based on attach request attempt messages that were sent by the unmanned aerial vehicle to serving cell equipment, determining that the unmanned aerial vehicle is located at a center portion of a broadcast coverage area cast by the serving cell equipment; and
- based on the determining that the unmanned aerial vehicle is located at the center portion of the broadcast coverage area and a numerical count value associated with the attach request attempt messages, instructing the serving cell equipment to set a transmission gain value associated with the serving cell equipment to a minimum value.

14. The non-transitory machine-readable medium of claim 13, wherein the serving cell equipment is associated with a collection of up tilted antennas.

15. The non-transitory machine-readable medium of claim 13, wherein the serving cell equipment is dedicated to service the unmanned aerial vehicle.

16. The non-transitory machine-readable medium of claim 13, wherein the serving cell equipment is capable of transmitting, using up tilted antennas, at a transmission power value greater than standard cells that serve terrestrial user equipment.

17. The non-transitory machine-readable medium of claim 13, wherein the serving cell equipment is capable of adjusting the transmission gain value from a first transmission gain value to a second transmission gain value.

18. The non-transitory machine-readable medium of claim 13, wherein in response to the transmission gain value being set to the minimum value, a broadcast penumbra cast by the serving cell equipment to service the unmanned aerial vehicle is decreased to cover a smaller geographic coverage area.

* * * * *